Oct. 2, 1962    H. J. FINDLEY    3,056,320
VIBRATING TOOLHOLDERS
Filed Oct. 9, 1959    5 Sheets-Sheet 1

INVENTOR.
HOWARD J. FINDLEY
BY Hudson, Boughton,
Williams, David & Hoffmann
ATTORNEYS

FIG. 4

Oct. 2, 1962  H. J. FINDLEY  3,056,320
VIBRATING TOOLHOLDERS
Filed Oct. 9, 1959  5 Sheets-Sheet 4

FIG. 7

INVENTOR.
HOWARD J. FINDLEY
BY Hudson, Boughton,
Williams, David & Hoffmann
ATTORNEYS

United States Patent Office 3,056,320
Patented Oct. 2, 1962

3,056,320
VIBRATING TOOLHOLDERS
Howard J. Findley, 995 Richmond Road, Lyndhurst, Ohio
Filed Oct. 9, 1959, Ser. No. 845,376
23 Claims. (Cl. 82—36)

This invention relates to toolholders for use in the removal of material from a workpiece during relative movement between the workpiece and a cutting tool, and more particularly to novel vibratory toolholders capable of vibrating or moving the cutting tool during removal of material from the work, whereby the removal can be accomplished with a lower power consumption and can be accomplished, either at a more rapid rate or at a normal rate with a correspondingly longer tool life, and the cuttings will be in the form of easily handled chips of small size.

The invention aims to provide, as one of the objects thereof, an improved toolholder unit for supporting and moving or vibrating a cutting tool, preferably in the form of a removable tool or tool bit, the unit comprising a tool support member having flexible portions and hydraulic power or vibratory drive means responsive to pulsating hydraulic pressure and operatively effective to move the tool support member in accordance with hydraulic pulsations provided by vibratory valve means controlling hydraulic fluid being supplied under pressure to the unit for energizing the vibratory drive means.

Another object of the invention is the provision of a vibratory toolholder of the above mentioned character having first and second valve means for producing hydraulic pressure pulsations in hydraulic fluid being supplied to the pressure responsive drive means, and by which the frequency and amplitude of vibration of the flexible tool support means may be varied to effect differing patterns or characteristics in the cutting movement of the tool supported thereby, the second valve means being in the nature of a relay or pilot valve for control of the hydraulic actuation of the first valve means and, in the preferred embodiment, being hydraulically reciprocated in a sustained vibratory or oscillatory manner.

Still another object is the provision of a vibratory toolholder unit comprising a base member having a reaction member thereon, a tool supporting yoke member secured to the base and having flexibly movable portions, and drive means acting between the reaction member and the yoke member to move the latter in response to hydraulic pressure pulsations produced by a hydraulically actuated valve means which places the drive means alternately in communication with a hydraulic pressure source and an exhaust outlet, the valve means being actuated under the control of another valve means forming a part of selectively variable vibratory means, which other valve means may in one embodiment be electromagnetically energized.

Yet another object of the invention is the provision of vibratory valve means in a hydraulically actuated vibratory toolholder unit and including first and second hydraulically reciprocable valve elements, the first valve element being under the control of the second, and the second valve element being adapted to reciprocate between stop members having an adjustable distance therebetween for varying the frequency of reciprocation or vibration.

As another object this invention aims to provide a toolholder unit having flexible tool supporting means adapted to be deflected in opposite directions by hydraulic power means and including variable rate vibratory valve means for deflecting the tool supporting means rapidly in one direction and relatively slowly in the opposite direction, the valve means including adjustable orifice means for varying the rate of deflection in either direction.

The invention can be further briefly summarized as consisting in certain novel combinations and arrangements of parts hereinafter described and particularly set out in the claims hereof.

In the accompanying sheets of drawings forming a part of this specification, and in which like reference numerals indicate like elements.

The illustrated vibratory toolholder unit 10 embodying this invention presents a detachable or removable nose piece or tool 11 having a bit or cutting tip 12 for engaging and removing material from a workpiece upon the occurrence of relative cutting movement between the tool and the workpiece. The unit 10 comprises a vibratory head 14 in the form of a yoke-shaped member having spaced parallel side portions as resilient arms 15 and 16 defining a recess 17 therebetween and extending in a longitudinal direction away from a tool mount portion 18 on which the nose piece or tool 11 is removably mounted as by screws 21. A vibration generator 20 is disposed in the recess 17 between the arms 15 and 16 of the head 14 and, as will later be described, provides controlled hydraulic pressure pulsations in hydraulic pressure fluid being supplied, for effecting vibration of the head 14 and of the tool 11 mounted thereon.

The vibration generator 20 is comprised in part of a block 22, to which the arms 15 and 16 of the head 14 are secured as by a plurality of screws 23, and which acts as a reaction member for hydraulic-pressure-pulsation responsive piston means 24 including flexible diaphragm type pistons 25 and 26 for driving the flexible arms 15 and 16. The block 22 is rigidly secured to a base member or mounting plate 28 as by screws 29 and 30, the screws 30 extending through the plate 28 for threaded engagement with suitable supporting means such as a portion of a compound slide mechanism or the like (not illustrated) of a machine tool for bringing the toolholder unit 10 and a workpiece into an operative position.

The vibration generator 20 also includes, in addition to the pulsation responsive piston means 24, vibratory valve means 34 comprising a ported sleeve 35 mounted in a bore 36 in the block 22, a first or primary valve spool 37 which is reciprocable within the sleeve 35, and a secondary valve spool 38 which is reciprocable within the primary spool 37. Hydraulic fluid of a suitable pressure value is supplied to the vibratory valve means 34 through a supply conduit 40 and is exhausted therefrom through an exhaust conduit 41.

The primary valve spool 37 is adapted to be hydraulically reciprocated and serves to alternately place the pressure responsive piston means 24 in communication with the hydraulic pressure supply and exhaust, while the secondary valve spool 38 is adapted to be hydraulically reciprocated in sustained vibratory motion and acts in the manner of a hydraulic relay or pilot valve to control the vibratory reciprocation of the primary spool. The valve means 34 is variable in the frequency and amplitude of the oscillations or vibrations thereof and the frequency and amplitude of the vibratory action of the head 14 and tool bit 12 may be varied accordingly. The variations in vibration are conveniently controlled through the use of a control knob 44 as will be more fully described hereafter in connection with the operation of the vibratory valve means 34. Suffice it to say that the toolholder unit 10 can therefore be operated at frequencies other than the resonant frequency of the yoke-shaped head 14, thereby providing a versatile unit which may be advantageously used in many applications.

Figure 1:
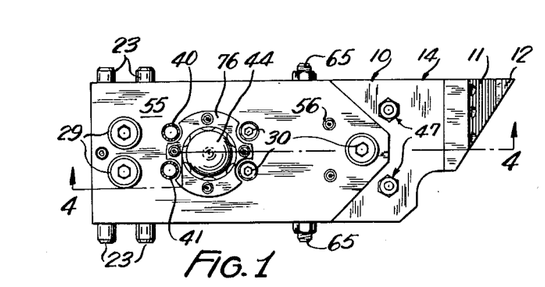
FIG. 1 is a plan view showing a toolholder unit embodying the invention and supporting a representative tool or tool bit.
Figure 2:
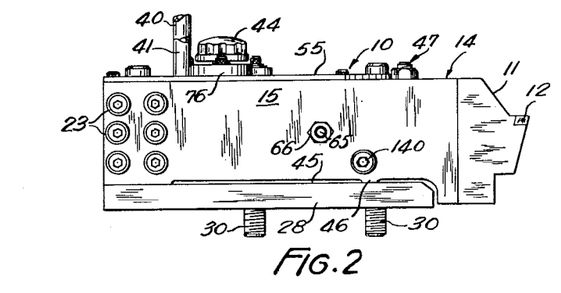
FIG. 2 is a side elevation of the toolholder and tool of FIG. 1.
Figure 3:
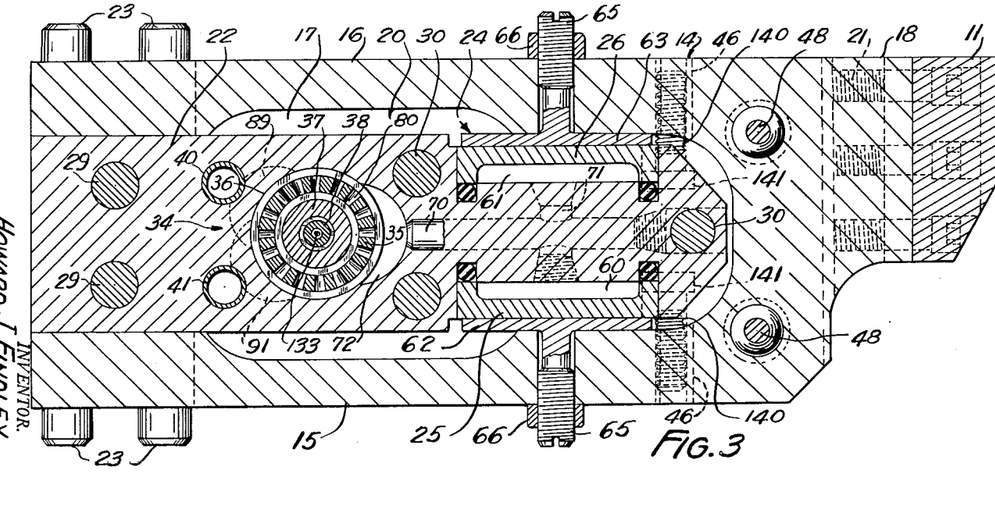
FIG. 3 is a longitudinal sectional view of the toolholder of FIG. 1 taken substantially as indicated by section line 3—3 of FIG. 4.
Figure 4:
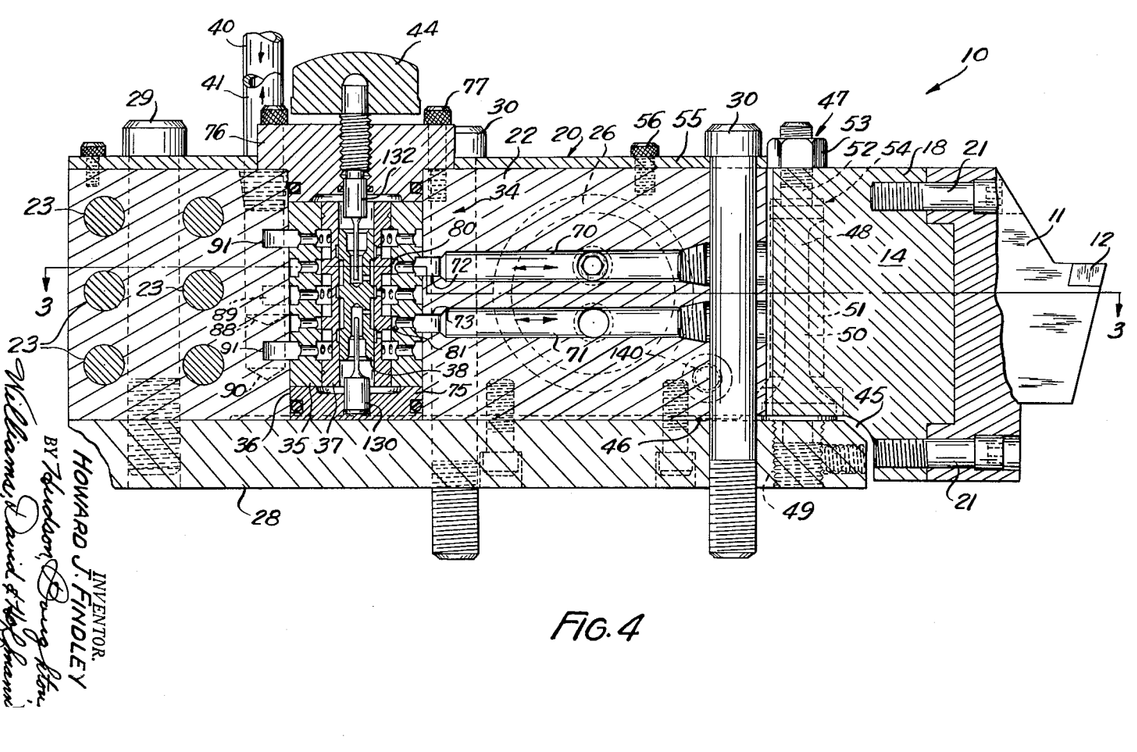
FIG. 4 is another such longitudinal sectional view of the toolholder taken substantially along line 4—4 of FIG. 1.

The yoke-shaped member of the head 14 which has the flexible arm portions 15 and 16 secured to the block 22, is spaced from the mounting plate 28 by an intervening space 45 so that the flexible arm portions and the tool mount portion 18 will be capable of a limited vibratory movement relative to the plate. A spacing lug 46 having a bearing surface is located on each of the arm portions 15 and 16. The lugs 46 may have a normal clearance of approximately .015 inch between their bearing surfaces and the plate 28 and are adapted to bear against the plate to preserve the space 45 when the nose piece 11 is under a heavy work load. The tool mount portion 18 is flexibly supported on the mounting plate 28 as by means of a pair of laterally spaced flexible mounts 47 provided by flexible studs 48. As shown in dotted lines in FIG. 4, these studs each have a shouldered and threaded lower end portion 49 attached to the mounting plate 28 and a flexible stem-portion 50 extending into and along a passage 51 of the head 14. Each stud 48 has a shouldered and threaded upper end portion 52 retained in supporting connection with the head 14 by a nut 53. Spacing washers 54 are advantageously included between the shoulder of the end portions 52 and the head 14 and serve to predetermine the clearance between the lugs 46 and the plate 28.

It will be apparent that the flexible connections 47 just described support the tool mount portion 18 of the head 14 in a manner to permit the desired vibration of the tool mount portion and the cutting tool 12 in a vibration plane parallel to the mounting plate 28.

A cover plate 55 is provided to prevent foreign matter such as cuttings or the like from lodging in the space 17 between the flexible arm portions 15, 16 of the head 14 and the block 22, and this cover plate is secured as by screws 56 to the block.

The block 22, which serves as a reaction member, contains a pair of aligned cylinders 60 and 61 in which the flexible diaphragm pistons 25 and 26 are received. The pistons 25 and 26 are retained in their respective cylinders by thrust buttons 62 and 63 which are engaged in force transmitting cooperation with the diaphragm portions of the pistons and have threaded stems 65 engaged in and extending through threaded openings in the arms 15 and 16. The outer ends of the stems 65 are slotted for the application of an adjusting tool thereto whereby the stems can be rotated in the threaded openings for adjustment of the buttons relative to the pistons. The stems 65 are provided with lock nuts 66 by which the buttons can be locked in the desired position of adjustment.

The reaction block 22 has fluid passages 70 and 71 therein which communicate with the cylinders 60 and 61 respectively for alternately supplying pressure fluid to, and exhausting fluid from, these cylinders under the control of the vibratory valve means 34. Thus, when pressure is supplied to the cylinder 60 through the passage 70, the diaphragm piston 25 will be moved or flexed in an outward direction to thereby flex the arm 15 of the head 14 in a corresponding outward direction. When the pressure fluid of the cylinder 60 is relieved through the passage 70, the resilient character of the arm 15 causes the same to be moved in an inward direction to impart a return movement to the piston 25 through the associated thrust button 62. While the fluid pressure of the cylinder 60 is being relieved, a pressure fluid impulse will be supplied to the cylinder 61 through its connecting passage 71.

The arms 15 and 16 will thus be flexed alternately at a rate corresponding to the hydraulic pressure pulsations supplied to the cylinders 60 and 61 and will result in a vibratory swinging or vibration of the tool mount portion 18 and of the cutting tool 11.

Turning now to a more specific description of the vibratory valve means 34, the ported sleeve 35 is positioned in the bore 36 in the block 22 by end closure members 75 and 76 disposed in sealing relation with the ends of the bore 36. The closure member 75 is retained in place by the mounting plate 28 and the closure member 76 is suitably secured to the block 22 as by screws 77.

Figure 5:
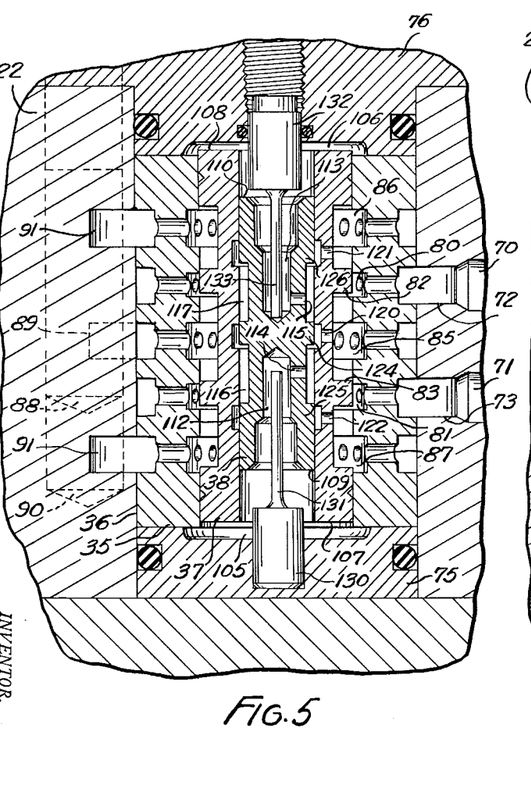
FIG. 5 is a fragmentary sectional view on an enlarged scale illustrating the valve structure of the toolholder of FIG. 1.

The sleeve 35 is provided with a pair of axially spaced internal annular ports 80 and 81, which are continually in communication with the passages 70 and 71 having arcuate relieved areas or cut outs 72 and 73 respectively, and are controlled by a pair of annular valve elements 82 and 83 carried by the reciprocable primary spool 37 as is best illustrated in FIG. 5. Cooperating portions of the sleeve 35 and the primary spool 37 also form annular chambers 85, 86 and 87, of which the chamber 85 is an intermediate chamber and the chambers 86 and 87 are end chambers located on opposite sides of the intermediate chamber. The intermediate chamber 85 is a pressure inlet chamber for the cylinders 60 and 61 and is continuously supplied with hydraulic fluid of a suitable pressure value through the supply conduit 40 and a connecting supply passage 88 in the block 22 and having an arcuate cut out 89. The end chambers 86 and 87 are exhaust chambers for the cylinders 60 and 61 and are connected with the exhaust conduit 41 by a passage 90 in the block 22 having arcuate cut outs 91.

Referring to FIG. 5, it will be observed that with the primary valve spool in a slightly displaced position with respect to the sleeve 35, hydraulic fluid will flow from the pressure inlet chamber 85 through the partially opened port 80 and passage 70 into the cylinder 60. At the same time the port 81 will be in communication with the end or exhaust chamber 87 thereby exhausting fluid from the cylinder 61 to the exhaust conduit 41. Similarly, displacement of the primary spool in the opposite direction will cause the cylinder 61 to be connected with the pressure inlet chamber 85 and the cylinder 60 to be connected with the exhaust chamber 86.

The end closure members 75 and 76 have recesses therein forming chambers 105 and 106 respectively with the end surfaces 107 and 108 of the primary valve spool and end surfaces 109 and 110 of the secondary valve spool. The secondary valve spool is provided with axially extending end bores or passages 112 and 113, and also with ports 114 and 115 communicating between those passages and annular chambers 116 and 117 formed by cooperating portions of the primary and secondary spools. The primary spool is provided with additional ports 120, 121 and 122, of which the port 120 is a pressure inlet port in communication with the pressure inlet chamber 85 and controlled by a valve element 124 carried on the secondary valve spool 38, and the ports 121 and 122 are pressure outlet ports in communication with the exhaust chambers 86 and 87 and controlled by valve elements 125 and 126 carried on the secondary spool.

From the foregoing description, and with reference to FIG. 5, it will be recognized that when the secondary valve spool 38 is displaced as illustrated, with respect to the primary valve spool 37, the port 120 will be partially open placing the chamber 116 in communication with the pressure inlet chamber 85. Hydraulic pressure fluid will thus be permitted to flow through the port 114 and bore 112 into the chamber 105 to act against the faces 107 and 109 of the primary and secondary spools for effecting movement thereof toward the chamber 106.

At the same time it will be observed that the chamber 106 is placed in communication with the exhaust chamber 86 via the bore 113, port 115, chamber 117 and the port 121, permitting hydraulic fluid in the chamber 106 to be exhausted as the valve spools are moved under the influence of hydraulic pressure in the chamber 105.

A secondary spool stop member 130 is mounted on the end closure member 75 and has a reduced end portion 131 extending into the bore 112. An adjustable stop member 132 is threadedly supported in the cover member 76 and has a reduced portion 133 extending into the bore 113, and illustrated in FIG. 5 in contact with the bottom thereof. The frequency control knob 44 is secured to the adjustable stop member 132 and provides means for conveniently screwing the adjustable stop in or out to a desired position.

The masses and end face areas of the primary and secondary valve spools are so related that the secondary spool 38 will move faster under the influence of hydraulic pressure in the chambers 105 and 106 than will the primary spool 37. Thus, the secondary spool 38 will lead the primary spool 37 until the secondary spool is stopped as by the stop member 132. The movement of the primary spool will continue and the inertia thereof will carry the primary spool beyond the stopped secondary spool to a position where the port 120 will place the pressure inlet chamber 85 in communication with the chamber 106 and the port 122 will place the chamber 105 in communication with the exhaust chamber 87. The secondary spool 38 will then be propelled in a direction toward the stop member 130, leading the primary spool 37 which will also move in that direction. When the secondary spool is stopped by the member 130 the primary spool will continue its motion until the port 120 again places the pressure inlet chamber 85 in communication with the chamber 105 and the above sequence of events will be repeated starting with the motion of the secondary spool toward the stop member 132.

It will now be appreciated that the reciprocation of the primary and secondary valve spools under the influence of hydraulic fluid pressure will be in the form of sustained oscillations or vibrations, with the primary spool being responsive to the action of the secondary spool which acts in the nature of a hydraulic relay or pilot valve.

The frequency and amplitude of the vibration of the head 14 and the associated tool 11 are dependent upon the pulsations of hydraulic fluid pressure resulting from the above described operation, which pulsations are governed in their characteristics by a number of factors such as the pressure at which the hydraulic fluid is supplied, the stroke or travel of the valve spools, and the sizes of certain of the ports.

Some of these governing factors may be conveniently varied, and in the toolholder unit 10 the stroke or travel of the secondary valve spool is adjustably limited by screwing the stop member 132 in or out by means of the knob 44 to vary the distance between the stop members. It will be evident that decreasing of the distance between the stop members 130 and 132 will decrease the time required for the valve spools to complete a stroke hence increasing the frequency of fluid pressure pulsations and of the vibration of the head 14. It will likewise be evident that increasing of the distance between the stop members will decrease the frequency of operation.

The amplitude of vibration or swinging movement of the head 14 with respect to the reaction block 22 can be limited through the agency of adjustable stops in the form of set screws 140. The set screws 140 are received in threaded openings in the arms 15 and 16 of the head 14 and are adapted to engage washer members 141 seated in the reaction block 22. The set screws are provided with sockets in the outer ends thereof to receive an adjusting wrench.

Figure 6:
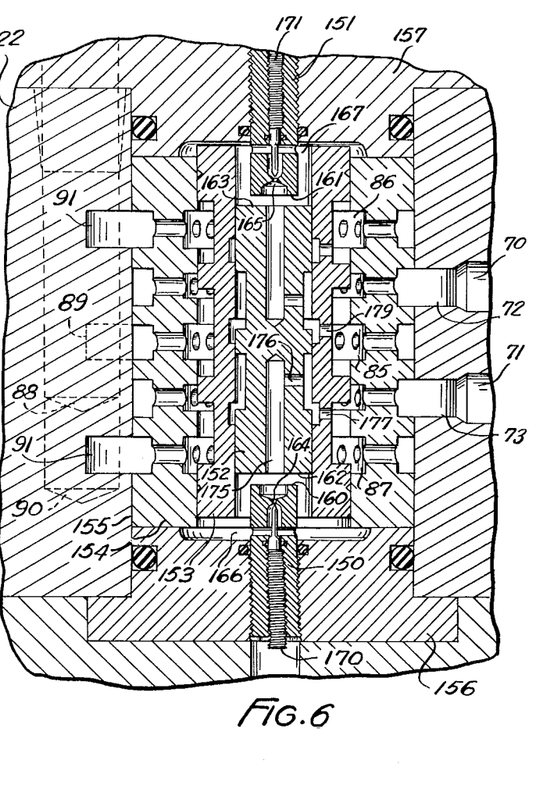
FIG. 6 is a fragmentary sectional view similar to FIG. 5 but illustrating another embodiment of valve structure.

A modification of the vibratory valve means is illustrated in FIG. 6, which provides more complete control of the characteristics of the vibratory motion of the head 14.

In this embodiment of the invention there are provided two adjustable stop members 150 and 151 for limiting the motion of the secondary valve spool 152, and additionally for varying the rate of movement of the primary valve spool 153. As in the previously described embodiment, the valve spools 152 and 153 are reciprocable within a sleeve 154 positioned in a bore 155 of the block 22 by end closure members 156 and 157.

The adjustable stop members 150 and 151 are threadedly received in the end closure members and are provided at their inner ends with annular surfaces 160 and 161 adapted to be engaged or abutted by corresponding end surfaces 162 and 163 of the secondary valve spool 152. The outer ends of the stop members 150 are slotted to receive an adjusting tool for screwing the stop members in or out to vary the stroke of the secondary spool 152.

The inner ends of the stop members 150 and 151 are provided with orifices 164 and 165 in communication, through passages in the stop members, with the end chambers 166 and 167 defined by the closure members 156 and 157 and the ends of the valve spools. A pair of needle valves 170 and 171 are disposed in threaded openings in the stop members 150 and 151 and serve to adjustably control flow of hydraulic fluid through the orifices 164 and 165.

The valve spools are illustrated in FIG. 6 with the secondary spool 152 travelling downwardly or toward the stop member 150 under the influence of hydraulic fluid pressure in the chamber 167. The secondary spool is shown as leading the primary spool 153 in movement and, when the surface 162 stops against the annular surface 160, a seal will there be made and movement of the primary spool will be yieldingly resisted by fluid in the chamber 166, which must pass through the restricted orifice 164 in passing to the exhaust conduit 41 of the toolholder unit via a passage 175, and ports 176 and 177, corresponding to passage 112 and ports 114 and 122 of the preferred embodiment.

Similarly, when the port 176 is placed in communication with the pressure supply port 179 of the primary spool 153, the secondary spool will be propelled by fluid pressure in the chamber 166 away from the stop member surface 160 and toward the stop member 151, engaging the sealing surface 161 thereof. Movement of the primary spool 153 toward the chamber 167 will then be governed by the rate of flow of hydraulic fluid from the chamber 167 through the orifice 165 to the exhaust conduit.

It will therefore be recognized that the reciprocatory movements of the valve spools 150 and 151 in the embodiment of FIG. 6 can be conveniently varied in their characteristics. For example, by adjusting the needle valve 170 to restrict the orifice 164, and adjusting the needle valve 171 to open the orifice 165, the primary spool will move rapidly in its travel toward the stop member 151 and relatively slowly in its travel toward the stop member 150. The resulting vibratory motion of the head 14 and the tool 11 carried thereby will consist of rapid deflections in one direction and slower deflections in the other direction. Various combinations of frequency, amplitude and rate of deflection may be arrived at thus providing a unique and more versatile vibratory toolholder than has been possible heretofore.

Figure 7:
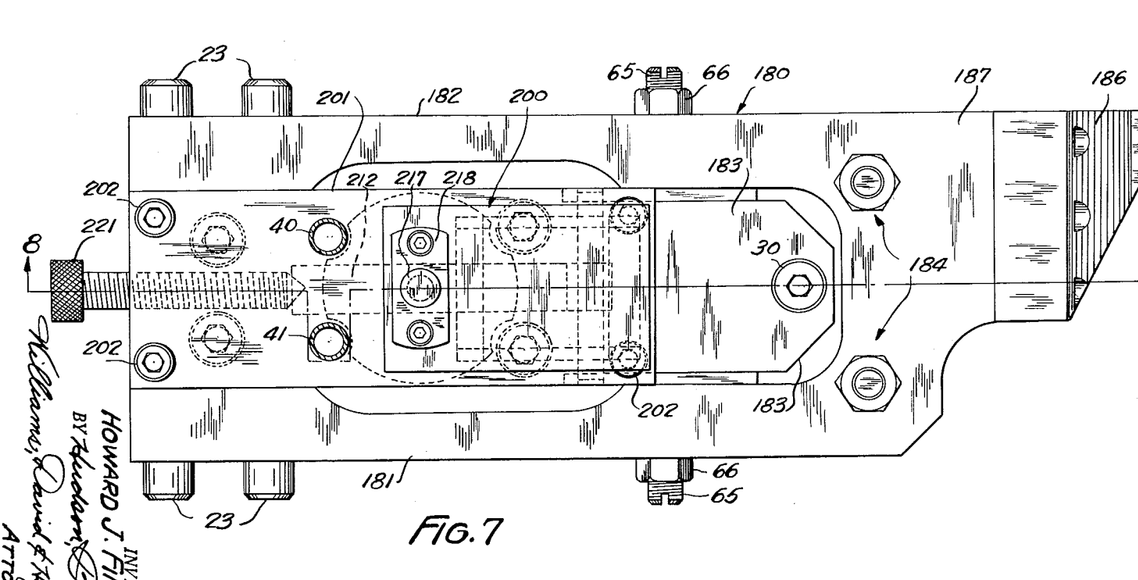
FIG. 7 is a plan view of a modified form of toolholder unit embodying the invention and which is hydraulically powered and electromagnetically controlled.
Figure 8:
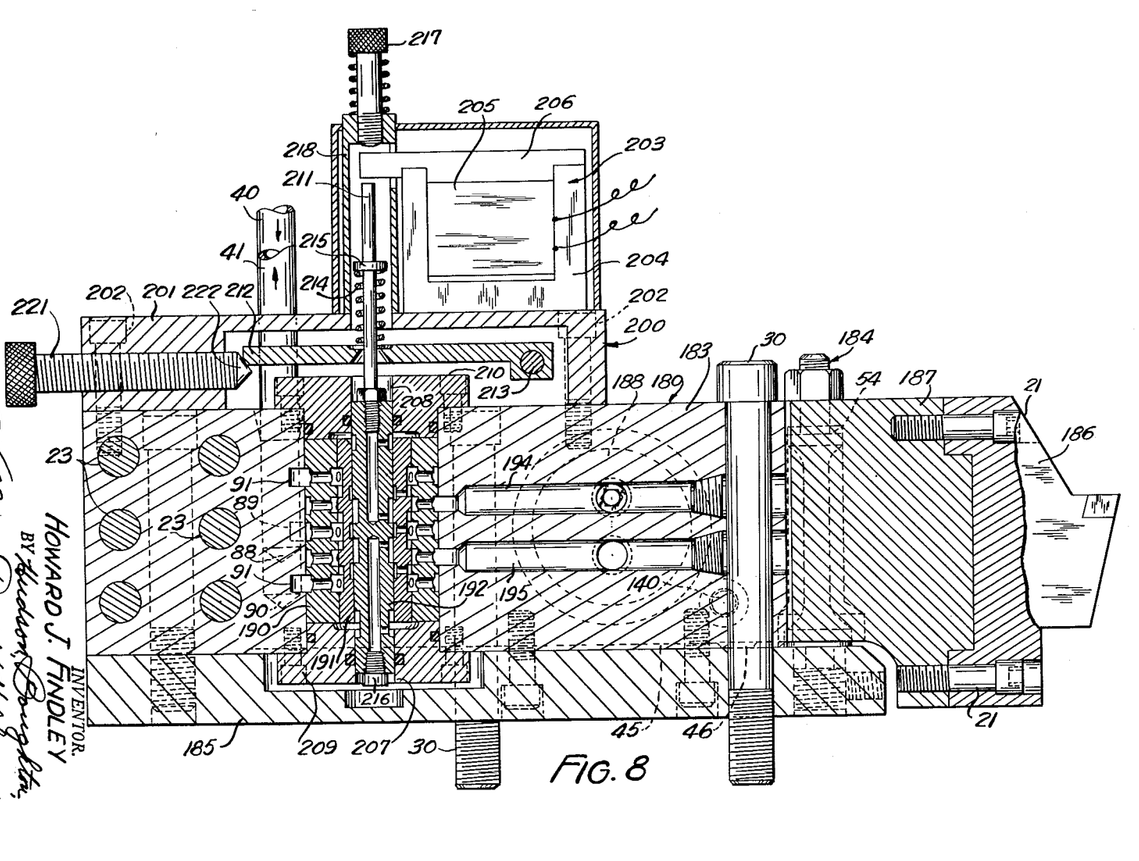
FIG. 8 is a vertical longitudinal sectional view of the embodiment of FIG. 7 taken substantially as indicated by line 8—8 thereof.

In some instances it is desirable to control the vibratory action by electric alternating current or pulsating direct current while providing the actual motive power for vibration of the cutting tool by hydraulic fluid pressure. The tool-holder modification illustrated in FIGS. 7 and 8 represents an electro-hydraulically actuated embodiment of the invention.

This embodiment, like those previously described, comprises a head 180 including a yoke-shaped member having flexible arm portions 181 and 182, secured to a reaction block 183 and movably supported by flexible mounts 184 to a base plate 185. A representative tool 186 is removably mounted on a tool mount portion 187 of the head 180 for vibration with the yoke-shaped member by pressure responsive piston means 188 acting between the reaction block 183 and the arms 181 and 182.

The vibratory valve means of the present embodiment includes a valve sleeve 190, a primary valve spool 191 and a secondary valve spool 192, the valve means serving to provide the hydraulic fluid pressure pulsations to the piston means 188 by supplying and exhausting fluid through the passages 194 and 195.

The secondary valve spool 192 is, in this embodiment, reciprocated to control the hydraulic actuation of the primary spool 191 by an electrotransducive means such as an electromagnetic drive means 200 which is provided to move the secondary spool in accord with electric alternating current or pulsating direct current.

The electromagnetic means 200 comprises a support 201 secured to the reaction block 183 as by screws 202 and having mounted thereon an electromagnet 203. The electromagnet comprises a core 204, an energizing coil 205, and an armature 206 movable relative to the core.

The secondary valve spool 192 is slidably received in suitable bores 207 and 208 in closure members 209 and 210 and an operating stem 211 is threadedly connected to the secondary spool and extendings upwardly through a tension adjusting arm 212 and an opening in the support 201. The tension adjusting arm 212 is pivoted at 213 to the support 201 and serves as an adjustable abutment for a compression spring 214 surrounding the stem 211 and bearing against a flange 215 thereon. The operating stem 211 and a plug 216 prevent loss of hydraulic fluid from the axially extending bores or passages of the secondary spool 192.

The valve ports, passages, and chambers of this embodiment (FIGS. 7 and 8) operate to supply hydraulic fluid to and from the piston means 188 in much the same manner as in the embodiments heretofore described. Thus, the secondary valve spool acts in the manner of a relay valve or pilot valve for controlling the hydraulic actuation of the primary valve spool.

The spring 214 continually urges the stem 211 and the secondary valve spool 192 toward the armature 206 of the electromagnet 203 for reciprocating actuation thereby in response to electric current applied to the coil 205. The stroke of the armature 206, and hence of the secondary spool 192, is adjustably governed by an adjusting screw 217 which is disposed in a threaded opening in a hollow member 218 housing the upper end of the stem 214. The screw 217 is adapted to be advanced or withdrawn and serves as a stop for the armature 206 in its travel.

A spring tension adjusting screw 221 is threadedly carried by the support 201 and has a tapered end 222 in engagement with the free end of the tension adjusting arm 212. The screw 221 can be screwed in or out to cause the tapered end 222 thereof to position the arm 212 and vary the biasing force of the spring 214. By this means the rate of movement of the secondary spool 192 may be controlled and, together with the screw 217 for adjusting the stroke of the spool 192, provides means for conveniently and effectively altering the characteristics of the vibratory motion of the head 180 and the tool 186 mounted thereon.

From the foregoing description and the accompanying drawings, it will now be readily understood that this invention provides vibratory toolholders embodying resiliently flexible portions and having fluid pressure pulsation responsive means for moving those portions, and a removable tool supported thereby, in accord with fluid pressure pulsations from novel vibration generating means, which vibration generating means is adapted to be adjustably controlled to vary the characteristics of the vibratory movements. It will also be understood that the vibration generating means includes vibratory valve structure which is reliable and efficient in operation and may be operated for long periods of time with little attention.

Although the invention has been described in detail with reference to several specific embodiments thereof, it is understood that the invention is not limited thereby, but rather the invention includes all adaptations, changes and modifications as are reasonably embraced by the scope of the appended claims.

Having thus described my invention, I claim:

1. A toolholder unit comprising a base, a tool having a cutting tip, a holder supporting said tool for engagement of said tip with a workpiece and comprising a yoke member having a pair of flexible portions, a reaction member on said base and disposed between said flexible portions, hydraulic power means operably connected between said reaction member and said flexible portions, said reaction member having hydraulic pressure inlet and outlet ports, first valve means reciprocably mounted in said reaction member for movement between first and second positions for placing said power means in communication alternately with said inlet and outlet ports for actuating said power means to cause flexing of said flexible portions and a consequent vibratory movement of said yoke member and tool, second valve means reciprocably mounted in said reaction member and effective to control hydraulic reciprocation of said first valve means, and adjustable control means for said second valve means for determining the frequency and amplitude of said vibratory movement.

2. A toolholder of the character described comprising a base including a reaction member having hydraulic fluid supply and exhaust passages, a yoke member comprising a tool mount portion and a pair of spaced flexible arm portions extending from said tool mount portion, said arm portions being disposed on opposite sides of said reaction member and connected to said base, fluid pressure responsive drive means between said reaction member and each of said arm portions for flexing thereof to effect vibratory movement of said tool mount portion with respect to said base, fluid pressure actuatable first valve means reciprocably mounted in said reaction member for movement between positions for placing said drive means in communication alternately with said supply and exhaust passages for actuating said drive means to effect said vibratory movement of said tool mount portion, vibratory second valve means reciprocably mounted in said reaction member for movement between first and second positions for controlling fluid pressure actuation of said first valve means, adjustable stop means on said reaction member for adjustably predetermining said first and second positions whereby said vibratory motion of said tool mount portion may be determined, and means for reciprocating said vibratory second valve means.

3. A toolholder as defined in claim 2 wherein said means for reciprocating said vibratory second valve means comprises means defining a pair of fluid pressure chambers, said second valve means having surfaces adapted to be acted upon by fluid pressure in said chambers, said second valve means having passages for placing said chambers alternately in communication with said supply and exhaust passages for effecting reciprocation of said second valve means.

4. A toolholder as defined in claim 2 wherein said means for reciprocating said vibratory second valve means comprises electrotransducive means on said reaction member, said electrotransducive means being responsive to variations in electric current to reciprocate said second valve means.

5. A toolholder of the character described comprising a base including a reaction member having fluid pressure supply and exhaust passages, a yoke member comprising a tool mount portion and a pair of spaced flexible arm portions extending from said tool mount portion and connected to said base, said reaction member having fluid motor cylinders defined therein, piston means in association with said cylinders and connected with said arm portions for movement thereof in response to fluid pressure pulsations in said cylinders, a first valve means reciprocably mounted in said reaction member for movement between positions for placing said cylinders alternately in communication with said fluid pressure supply and exhaust passages so as to actuate said pistons to effect vibratory movement of said tool mount portion, fluid pressure chambers in said reaction member and defined in part by end surfaces of said first valve means, second valve means mounted in said reaction member for reciprocation between first and second positions and adapted to place said fluid pressure chambers alternately in communication with said supply and exhaust passages so that fluid pressure pulsations in said chambers act on said end surfaces to cause reciprocation of said first valve means, and adjustable stop means on said reaction member for determining said first and second positions whereby said vibratory motion of said tool mount portion may be varied.

6. A toolholder as defined in claim 3 and wherein the communication between said fluid pressure chambers and said exhaust passage is limited by orifices of predetermined size whereby the rate of movement of said first valve means is determined.

7. A toolholder as defined in claim 6 and including needle valve means for adjustably determining the sizes of said orifices and controlling said rate of movement of said first valve means.

8. In a toolholder unit for the cutting tool of a machine tool, a reaction member, a cutting tool support member attached to said reaction member and flexibly movable with respect thereto, fluid pressure pulsation responsive drive means effective on said tool support member for causing the flexible movement thereof, pressure fluid supply and exhaust passages in said reaction member, fluid pressure actuatable first valve means for alternately placing said drive means in communication with said inlet passage and said outlet passage, second valve means associated with and controlling actuation of said first valve means, said first valve means comprising a primary valve spool reciprocably mounted in said reaction member and having a central bore, said second valve means comprising a secondary valve spool reciprocably mounted in said central bore of said primary valve spool, first and second fluid pressure chambers defined in part by end surfaces of said primary valve spool, said sceondary valve spool having ports for placing said first and second fluid pressure chambers alternately in communication with said supply and exhaust passages upon reciprocation of said secondary valve spool, whereby said primary valve spool is reciprocated by fluid pressure in said chambers acting on said end surfaces, adjustable stop members for determining the stroke length for the reciprocation of said secondary valve spool, said stop members having orifices therein effective to limit flow of fluid through said ports between said fluid pressure chambers and said exhaust passage, and needle valve means for independently varying said orifices whereby said secondary spool may be reciprocated with one rate of travel in one direction and a different rate of travel in the opposite direction.

9. In a toolholder unit for a machine tool, support means adapted for mounting of a cutting tool thereon and having a flexibly movable portion, fluid pressure responsive drive means operably associated with said movable portion for flexing thereof to cause a consequent vibratory movement of said cutting tool, fluid pressure actuatable first valve means for controlling fluid pressure flow to said drive means, second valve means for controlling fluid pressure actuation of said first valve means, said second valve means comprising a reciprocably mounted valve element, and electrotransducive means operatively associated with said element for actuation thereof upon energization of said electrotransducive means.

10. A toolholder unit as defined in claim 9 wherein said electrotransducive means comprises an electromagnetic drive means including an armature movable in response to pulsations in electric energizing current, said armature being arranged to effect actuation of said valve element in accord with said pulsations, and adjustable stop means for controlling the actuation of said valve element, whereby movement of said first valve means and flexing of said flexibly movable portion may be varied.

11. A toolholder unit of the character described comprising a tool support member having a pair of spaced flexible arms joined by a tool mount portion, a vibration generating means disposed between said arms and having said arms secured thereto, said vibration generating means comprising first and second fluid pressure responsive motors each adapted to act on one of said arms for flexing thereof and deflecting said tool mount portion, a sleeve having axially spaced fluid exhaust ports and an intermediate fluid pressure supply port, said sleeve having additional ports in communication with said first and second motors, a primary valve spool reciprocably mounted in said sleeve and having valve elements controlling said additional ports, displacement of said primary valve spool in one direction with respect to said sleeve being effective to place said first and second motors in communication with said supply port and one of said exhaust ports respectively, displacement of said primary valve spool in the other direction being effective to place said first and second motors in communication with the other of said exhaust ports and said supply port respectively, means cooperating with end surfaces of said primary valve spool to define first and second fluid pressure chambers, said primary valve having a central bore and having spaced ports in communication with said exhaust ports and an intermediate port in communication with said supply port, a secondary valve spool reciprocably mounted in the bore of said primary valve spool and having valve elements controlling said spaced and intermediate ports of said primary valve spool, said secondary valve spool having passages therein in communication with said first and second chambers, displacement of said secondary valve spool in one direction with respect to said primary valve spool being effective to place said first and second chambers in communication with said supply port and one of said exhaust ports respectively whereby fluid pressure in said first chamber will effect movement of said primary valve spool in said one direction, displacement of said secondary valve spool in the other direction with respect to said primary valve spool being effective to place said first and second chambers in communication with the other of said exhaust ports and with said supply port respectively whereby fluid pressure in said second chamber will effect movement of said primary valve spool in said other direction, and means for alternately displacing said secondary spool in said one and said other directions with respect to said primary valve spool.

12. A toolholder unit as defined in claim 11 wherein said first and second chambers are defined in part by end surfaces of said secondary valve spool whereby fluid pressure in said first and second chambers will effect movement of said secondary valve spool in said one and other directions respectively, and said means for alternately displacing said secondary valve spool comprises adjustable stop means for limiting movement of said secondary valve spool in each of said directions while permitting movement of said primary valve spool, the end surfaces and masses of said valve spools being so related that fluid pressure in said chambers effects more rapid movement of said secondary valve spool than of said primary valve spool whereby said secondary valve spool serves as a relay valve for sustained vibratory reciprocation of said primary valve spool and deflection of said tool mount portion.

13. A toolholder unit as defined in claim 11 wherein said means for alternately displacing said secondary valve spool comprises electromagnetic means responsive to electric current pulsations to effect reciprocating movement of said secondary valve spool in accord with said electric current pulsations, said electromagnetic means including a vibratory armature, means connecting said armature to said secondary valve spool, and adjustable stop means for limiting movement of said secondary valve spool in each of said directions while permitting movement of said primary valve spool, whereby said secondary valve spool serves as a relay valve for vibratory reciprocation of said primary valve spool and deflection of said tool mount portion.

14. In a toolholder unit; a support; a tool having a cutting tip; holder means supporting said tool for engagement of said tip with a workpiece; said holder means comprising a yoke member having an end portion to which said tool is attached, and a pair of spaced flexible arms connected at one end thereof with said end portion and connected adjacent the other end thereof with said support and providing for vibration of said tool and tip in response to flexing of said arms; a fluid pressure supply means; fluid pressure responsive drive means effective against said yoke member along the direction of the spacing of said arms for causing the flexing of said arms; and control means comprising fluid pressure actuatable valve means automatically actuatable by the fluid pressure and controlling the supply of said fluid pressure to said drive means.

15. A toolholder unit as defined in claim 14 wherein said control means comprises a fluid pressure actuatable first valve means controlling the supply of fluid pressure to said drive means, and a second valve means associated with and controlling the fluid pressure actuation of said first valve means.

16. A toolholder unit as defined in claim 14 wherein said drive means is connected with said support and located between said arms.

17. A toolholder unit as defined in claim 14 wherein said support includes a reaction means disposed between said arms; said drive means being located on said reaction means and having oppositely extending portions effective against said arms.

18. A toolholder unit as defined in claim 14 wherein said control means comprises a fluid pressure actuatable first valve means controlling the supply of fluid pressure to said drive means, and a second valve means associated with and controlling the fluid pressure actuation of said first valve means; and electrotransducive means operatively associated with said second valve means to cause actuation thereof upon energization of said electrotransducive means.

19. In a toolholder unit; a support including a reaction means; a tool having a cutting tip; an elongate holder connected adjacent one end thereof with said support and on the other end thereof supporting said tool for engagement of said tip with a workpiece; said holder having a pair of flexible arms intermediate the ends thereof and spaced apart in a direction transverse to the longitudinal axis of the holder; said arms being on opposite sides of said reaction means; a fluid pressure supply means; fluid pressure responsive drive means effective between said reaction means and said arms for flexing the latter to cause vibration of said tool and tip; and control means comprising fluid pressure actuatable valve means controlling the supply of fluid pressure to said drive means.

20. A toolholder unit as defined in claim 19 wherein said valve means comprises a fluid pressure actuatable first valve means controlling the supply of fluid pressure to said drive means, and a second valve means associated with and controlling the fluid pressure actuation of said first valve means.

21. A toolholder unit as defined in claim 19 wherein said drive means comprises cylinder means on said reaction means, and piston means operable in said cylinder means and connected with said arms; said valve means being connected with said cylinder means by passages in said reaction means.

22. A toolholder unit as defined in claim 19 wherein said drive means comprises cylinder means on said reaction means, and piston means operable in said cylinder means and connected with said arms; valve chamber means on said reaction means and connected with said cylinder means by passages in said reaction means; said valve means comprising a first fluid pressure actuatable valve means in said chamber means for controlling said passages, and a second valve means in said chamber means and controlling the fluid pressure actuation of said first valve means.

23. A toolholder unit as defined in claim 22 wherein said first and second valve means are in an inner and outer coaxial relation in said valve chamber means.

References Cited in the file of this patent

UNITED STATES PATENTS

| | | |
|---|---|---|
| 738,209 | Lewis | Sept. 8, 1903 |
| 1,292,494 | Lorenz | Jan. 28, 1919 |
| 1,927,499 | Nell et al. | Sept. 19, 1933 |
| 2,308,151 | Bagdel | Jan. 12, 1943 |
| 2,455,183 | Lobdell | Nov. 30, 1948 |
| 2,472,568 | Burt | June 7, 1949 |
| 2,921,559 | Herrmann | Jan. 19, 1960 |

FOREIGN PATENTS

| | | |
|---|---|---|
| 22,195 | Russia | Aug. 27, 1912 |